United States Patent
Yang et al.

(10) Patent No.: US 8,756,200 B2
(45) Date of Patent: *Jun. 17, 2014

(54) UNDO ADVISOR

(75) Inventors: Wanli Yang, San Mateo, CA (US); Amit Ganesh, San Jose, CA (US); Bipul Sinha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2248 days.

This patent is subject to a terminal disclaimer.

(21) Appl. No.: 10/846,095

(22) Filed: May 14, 2004

(65) Prior Publication Data

US 2005/0256829 A1    Nov. 17, 2005

(51) Int. Cl.
*G06F 17/30* (2006.01)

(52) U.S. Cl.
USPC .......................................... 707/662

(58) Field of Classification Search
USPC ............ 707/2–3, 100–200, 662, 684; 706/50; 711/170
See application file for complete search history.

(56) References Cited

U.S. PATENT DOCUMENTS

| | | | |
|---|---|---|---|
| 4,674,039 A | 6/1987 | Chouery | |
| 5,129,070 A | 7/1992 | Dorotte | |
| 5,761,672 A | 6/1998 | Samuelsson et al. | |
| 5,890,000 A | 3/1999 | Aizikowitz et al. | |
| 5,907,848 A | 5/1999 | Zaiken et al. | |
| 6,185,577 B1 * | 2/2001 | Nainani et al. | 707/202 |
| 6,192,377 B1 | 2/2001 | Ganesh et al. | |
| 6,272,612 B1 | 8/2001 | Bordaz et al. | |
| 6,574,717 B1 | 6/2003 | Ngai et al. | |
| 6,587,847 B1 * | 7/2003 | Stier et al. | 706/50 |
| 6,591,298 B1 | 7/2003 | Spicer et al. | |
| 6,631,374 B1 | 10/2003 | Klein et al. | |
| 6,694,340 B1 | 2/2004 | Lyle et al. | |
| 6,976,022 B2 | 12/2005 | Vemuri et al. | |
| 6,981,004 B2 | 12/2005 | Ganesh et al. | |
| 7,035,990 B1 | 4/2006 | Muhlbauer | |
| 7,047,386 B1 * | 5/2006 | Ngai et al. | 711/170 |
| 7,110,998 B1 | 9/2006 | Bhandari et al. | |
| 7,127,456 B1 * | 10/2006 | Brown et al. | 707/3 |
| 7,305,422 B1 * | 12/2007 | Wang | 707/203 |
| 7,574,419 B2 * | 8/2009 | Krishnaswamy et al. | 1/1 |
| 7,885,939 B2 * | 2/2011 | Krishnaswamy et al. | 707/684 |
| 2002/0091694 A1 | 7/2002 | Hrle et al. | |
| 2004/0054643 A1 | 3/2004 | Vemuri et al. | |
| 2004/0054644 A1 | 3/2004 | Ganesh et al. | |
| 2005/0015563 A1 * | 1/2005 | Yang et al. | 711/170 |
| 2005/0114409 A1 | 5/2005 | Sinha et al. | |
| 2005/0120062 A1 | 6/2005 | Sinha et al. | |
| 2005/0120064 A1 | 6/2005 | Sinha et al. | |

(Continued)

OTHER PUBLICATIONS

Burke, M. "An Interval-Based Approach to Exhaustive and Incremental Interprocedural Data-Flow Analysis" ACM Transactions on Programming Languages and Systems, Jul. 1990, vol. 12, No. 3, pp. 341-395.

(Continued)

*Primary Examiner* — Sheree Brown
(74) *Attorney, Agent, or Firm* — Vista IP Law Group, LLP

(57) ABSTRACT

A method and apparatus for data recovery are disclosed. Undo tablespace size is calculated for user-specified undo retention time based on system statistics collected over a period of time specified by a history time parameter.

45 Claims, 8 Drawing Sheets

(56) References Cited

U.S. PATENT DOCUMENTS

| | | | |
|---|---|---|---|
| 2005/0125430 | A1 | 6/2005 | Souder et al. |
| 2005/0131966 | A1 | 6/2005 | Lou |
| 2005/0182658 | A1 | 8/2005 | Abraham-Fuchs et al. |
| 2005/0240633 | A1 | 10/2005 | Krishnaswamy et al. |
| 2005/0256829 | A1* | 11/2005 | Yang et al. ............... 707/1 |
| 2005/0256849 | A1* | 11/2005 | Krishnaswamy et al. ........ 707/3 |
| 2007/0083488 | A1* | 4/2007 | Krishnaswamy ............. 707/2 |
| 2007/0083566 | A1* | 4/2007 | Krishnaswamy et al. .... 707/200 |

OTHER PUBLICATIONS

Chin, R.S. et al. "Distributed Object-Based Programming Systems" ACM Computing Surveys, Mar. 1991, vol. 23, No. 1, pp. 91-124.

Chiueh, T. et al. "Zodiac: A History-Based Interactive Video Authoring System" Proceedings of the 6th ACM International Conference on Multimedia (Multimedia '98), Bristol, UK, Sep. 1998, pp. 435-443.

Hudson, S.E. et al. "Object-Oriented Database Support for Software Environments" Proceedings of the 1987 ACM SIGMOD International Conference on Management of Data (SIGMOD '87), San Francisco, CA, May 27-29, 1987, vol. 16, No. 3, pp. 491-503.

Kunz, T. et al. "Fast Detection of Communication Patterns in Distributed Executions" Proceedings of the 1997 Conference of the Centre for Advanced Studies on Collaborative Research, Nov. 1997, pp. 1-13.

Leehane, T. "Level II Technical Support in a Distributed Computing Environment" Proceedings of the 24th Annual ACM SIGUCCS Conference on User Services, Sep. 1996, pp. 95-99.

Lomet, D.B. "MLR: A Recovery Method for Multi-level Systems" Proceedings of the 1992 ACM SIGMOD International Conference on Management of Data (SIGMOD '92), San Diego, CA, Jun. 2-5, 1992, vol. 21, No. 2, pp. 185-194.

Randell, B. et al. "Reliability Issues in Computing System Design" ACM Computing Surveys, Jun. 1978, vol. 10, No. 2, pp. 123-165.

Santry, D.S. et al. "Deciding when to forget in the Elephant file system" Proceedings of the 17th ACM Symposium on Operating Systems Principles (SOSP '99), Kiawah Island, SC, Dec. 1999, vol. 33, No. 5, pp. 110-123.

Soares, P.G. "On Remote Procedure Call" Proceedings of the 1992 Conference of the Centre for Advanced Studies on Collaborative Research, Nov. 1992, vol. 2, pp. 215-267.

Thatte, S.M. "Persistent Memory: A Storage Architecture for Object-Oriented Database Systems" Proceedings on the 1986 International Workshop on Object-Oriented Database Systems, Sep. 1986, pp. 148-159.

Office Action dated Nov. 2, 2006 for U.S. Appl. No. 10/846,099.
Office Action dated Jul. 16, 2007 for U.S. Appl. No. 10/846,099.
Office Action dated Mar. 25, 2008 for U.S. Appl. No. 10/846,099.
Office Action dated Oct. 1, 2008 for U.S. Appl. No. 10/846,099.
Office Action dated Sep. 7, 2007 for U.S. Appl. No. 11/249,150.
Office Action dated Dec. 17, 2007 for U.S. Appl. No. 11/249,150.
Office Action dated Jul. 22, 2008 for U.S. Appl. No. 11/249,150.
Office Action dated Feb. 10, 2009 for U.S. Appl. No. 11/249,150.
Office Action dated Dec. 13, 2007 for U.S. Appl. No. 11/249,149.
Office Action dated Jun. 9, 2008 for U.S. Appl. No. 11/249,149.
Office Action dated Dec. 24, 2008 for U.S. Appl. No. 11/249,149.
Non Final Office Action dated Jan. 5, 2010 for U.S. Appl. No. 11/249,149.
Notice of Allowance dated May 21, 2010 for U.S. Appl. No. 11/249,149.
Final Office Action dated Feb. 18, 2010 for U.S. Appl. No. 11/249,150.
Non-Final Office Action dated Sep. 14, 2010 for U.S. Appl. No. 11/249,150.
Notice of Allowance dated Oct. 4, 2010 for U.S. Appl. No. 11/249,150.

* cited by examiner

| Length of longest query | Undo Records | Current undo retention table size | Current undo retention time |
|---|---|---|---|
|  |  |  |  |

FIG. 2

UNDO ADVISOR

FIELD

Embodiments of the invention relate to computer systems, and more particularly to data recovery.

BACKGROUND OF THE INVENTION

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system.

Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table was modified, the changes will be stored in the undo record identifying the block of the database system that includes the modified table row.

Memory or disk space needs to be allocated for storage of undo records. Database managers usually set the undo tablespace size by predicting how much undo records may be generated. Often there is not enough statistical information available for database administrators to use in order to arrive at an accurate prediction of undo records generation. Incorrect undo tablespace size may cause errors in the system, as not enough undo records may be available. Alternatively, allocating too much memory or disk space for storing undo records is inefficient.

Moreover, database administrators need to predict how many undo records need to be maintained. Database system activity levels may fluctuate, for example during regular business hours activity levels may be higher than at night. Not only predicting how many undo records need to be maintained is difficult since database administrators do not have access to a lot of statistical information, changing that parameter as system activity levels change becomes almost impossible, as it requires someone to constantly monitor system activity and change the parameter as needed.

What is needed, therefore, is a solution that overcomes these and other shortcomings of the prior art.

SUMMARY OF THE INVENTION

Methods and apparatuses for data recovery are described. Embodiment of the invention include calculating undo tablespace size for user-specified undo retention time based on system statistics collected over a period of time specified by a history time parameter.

BRIEF DESCRIPTION OF THE DRAWINGS

The invention is illustrated by way of example and not limitation in the figures of the accompanying drawings, in which like references indicate similar elements and in which:

FIG. 2 illustrates an exemplary structure of a statistics table according to one embodiment of the invention;

DETAILED DESCRIPTION

Methods and apparatuses for data recovery are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Figure 1:
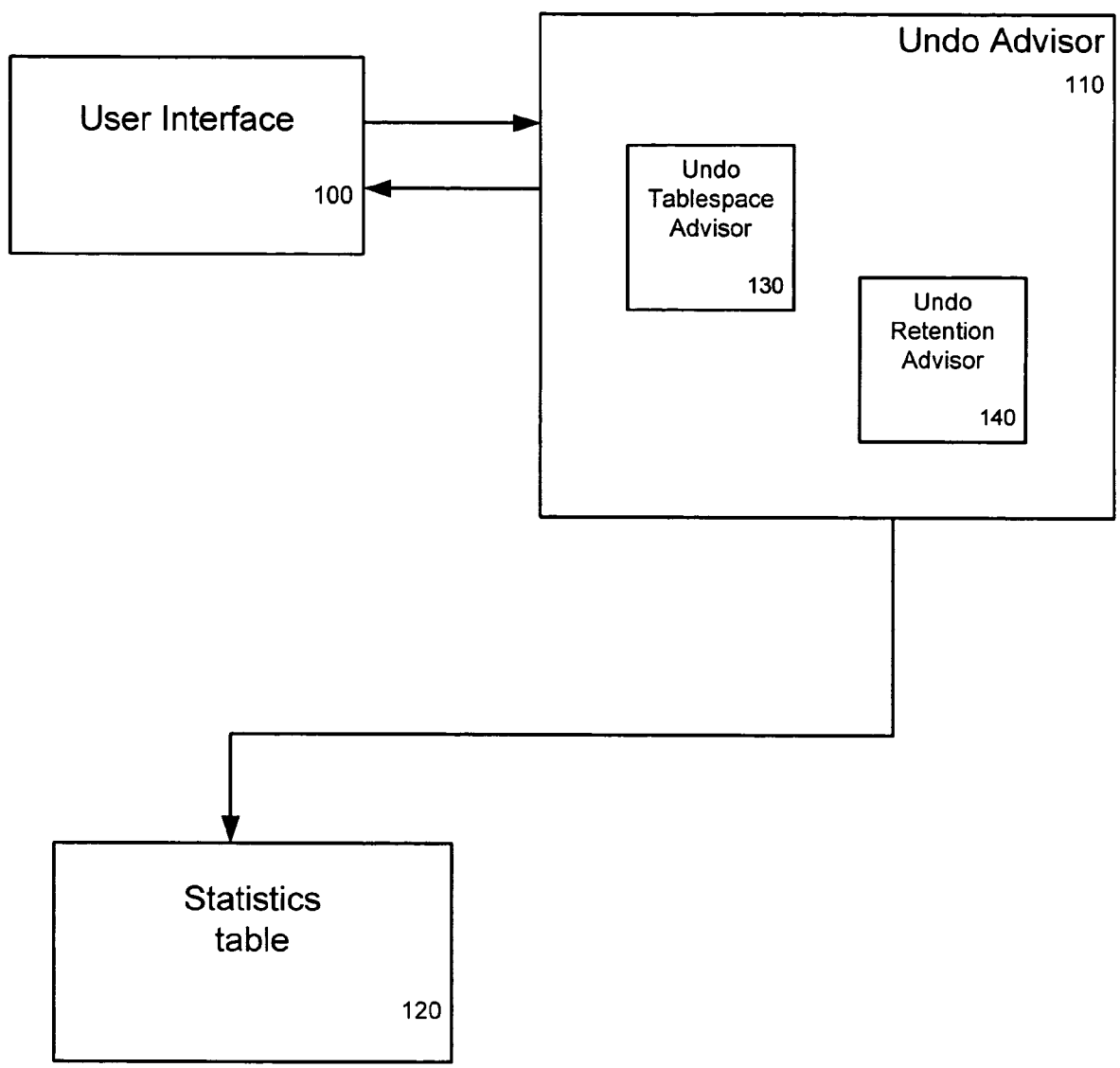
FIG. 1 illustrates an exemplary system architecture according to one embodiment of the invention.

In one embodiment of the invention, a user of a database system requests via a user interface 100 of FIG. 1, recommendations for the size of an undo tablespace and the length of time during which undo records should be available. Undo retention refers to how long database management systems maintain undo records. In response to the request, undo advisor 110, utilizing a statistics table 120, provides the requested recommendations. The statistics table 120 includes information about used undo records and the length of the longest running query per a particular time period, for example, 10 minutes. The statistics table 120 may also include other information, some of which is reflected in FIG. 2. It will be appreciated that the structure of the statistics table is not limited to the one described herein and illustrated in FIG. 2 and other structures and formats may be utilized without departing from the scope of the invention.

Undo Retention Tablespace Size Recommendation

Figure 3:
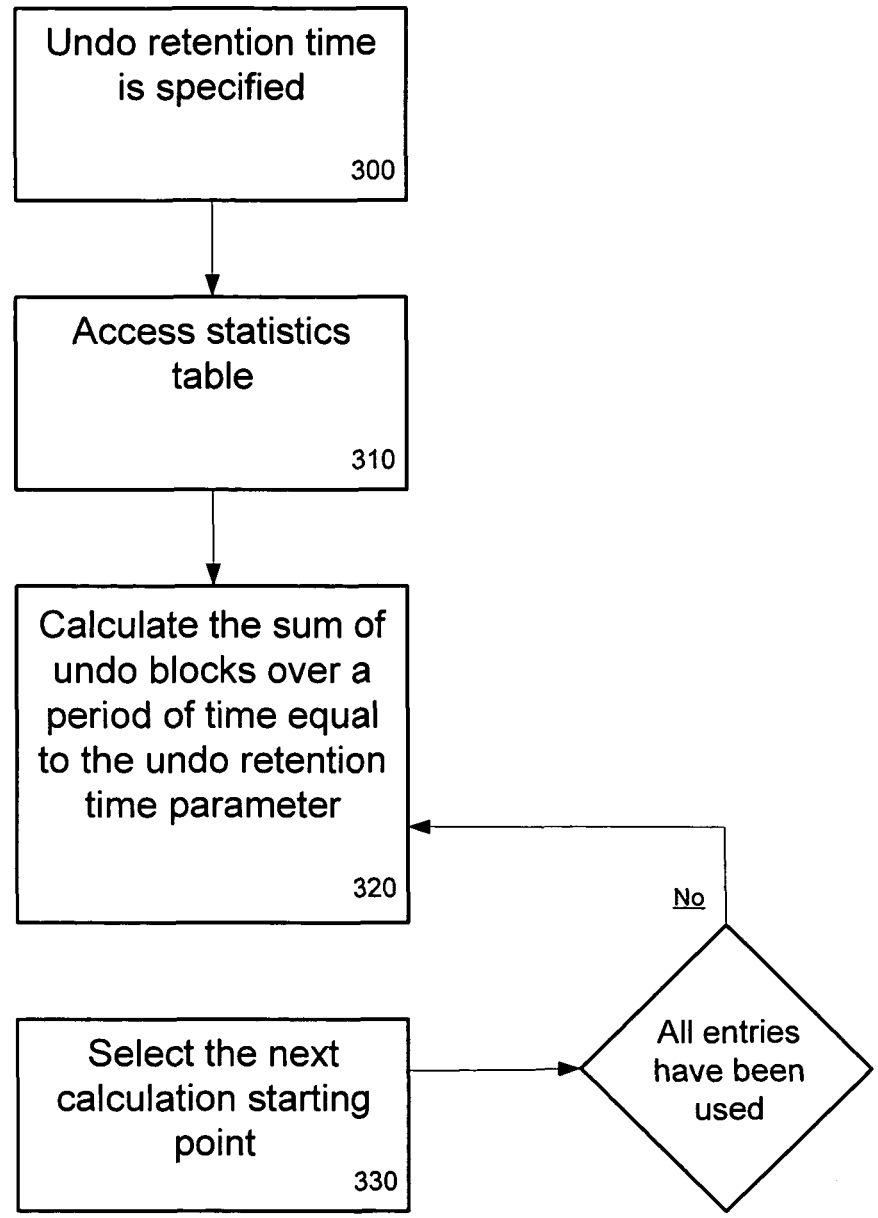
FIG. 3 is a flow diagram of a recommendation of undo tablespace size process according to one embodiment of the invention.

In one embodiment of the invention, at 300 of FIG. 3 a user specifies the desired undo retention time, for example 3 hours, to ensure that data can always be recovered to a state as of 3 hours prior to current time. The user then requests a recommendation of an undo tablespace size large enough to store data necessary for data recovery for a period of the desired undo retention time, e.g., 3 hours. In one embodiment, the user also specifies time period of system level activity to use in the recommendation calculations. Thus, the user may request undo tablespace size recommendation for storing 3 hours worth of undo records based on system level activity of the past 3 days, i.e. a history time parameter.

In response to the user's request, at 310 the undo tablespace size advisor 130 accesses the statistics table 120 to perform necessary calculations using the user-specified history time parameter. In one embodiment if the user does not specify the history time parameter, the undo tablespace size advisor 130 retrieves statistics information collected over the past seven days, otherwise the undo tablespace size advisor 130 retrieves statistics information collected over a period of time specified by the history time parameter.

At 320 the undo tablespace size advisor calculates the sum of undo blocks generated over a period of time equal to the user-specified undo retention time parameter starting with the most recent statistics interval. A statistics interval is a period of time associated with each statistics table entry. For example, if statistics interval is 10 minutes, then each statistics table entry includes an average of data collected over a 10 minute interval, and a set of statistics table entries includes statistics data collected over a number of consecutive 10 minute intervals. Thus, if the undo retention time parameter is 3 hours, then the undo tablespace size advisor 130 calculates the amount of undo tablespace size that is necessary to store the undo blocks generated over the 3 hour period by calculating the sum of undo retention blocks entries in the statistics table starting with the most recent entry in the statistics table and ending with the statistics table entry recorded 3 hours prior to the most recent one.

Upon storing the result of the summation operation, at 330 the undo tablespace size advisor 130 performs the same summation operation starting with the second most recent entry in the statistics table and ending with the entry recorded 3 hours prior to the second most recent one. Upon storing the result of this second summation operation, the undo tablespace size advisor 130 performs the same operation starting with the third most recent entry in the table and so on, until all entries recorded during a time interval equal to the history time parameter have been used in the calculations. For example, continuing with the example introduced above, if the history time parameter was specified to be 3 days, then the undo advisor performs summation operations until all statistics entries recorded in the last three days have been used.

It will be appreciated that the undo retention time and history time parameters may be specified to any value and the values of 3 hours and 3 days were used for exemplary purposes only in order to facilitate understanding of the invention.

Figure 4:
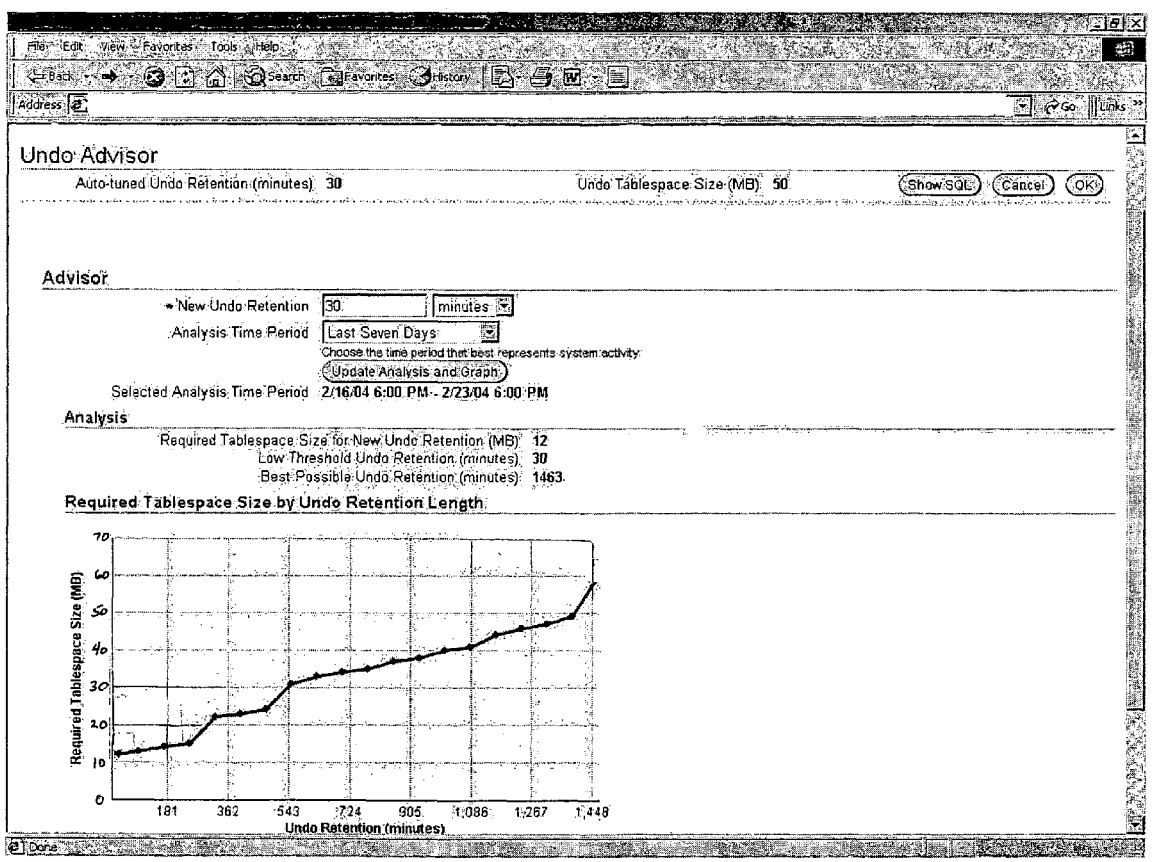
FIG. 4 illustrates an exemplary graphical user interface according to one embodiment of the invention.

In one embodiment of the invention, the undo tablespace size advisor selects the maximum sum from all the summation results and provides the user with the recommendation to set the undo tablespace size to the value of the maximum sum. In alternative embodiment, the undo tablespace size advisor provides the user with the recommendation to set the undo tablespace size to the value of 110% of the maximum sum. In one embodiment, the undo tablespace size advisor provides the user with the recommendation to set the undo tablespace size to the value of the average of all the sums. In one embodiment, the recommended undo tablespace size is presented to the user via a graphical user interface, an example of which is illustrated in FIG. 4

In one embodiment, upon acceptance of the recommendation by the user, the undo tablespace size is set to the recommended value.

Best Possible Undo Retention Indication

Figure 5:
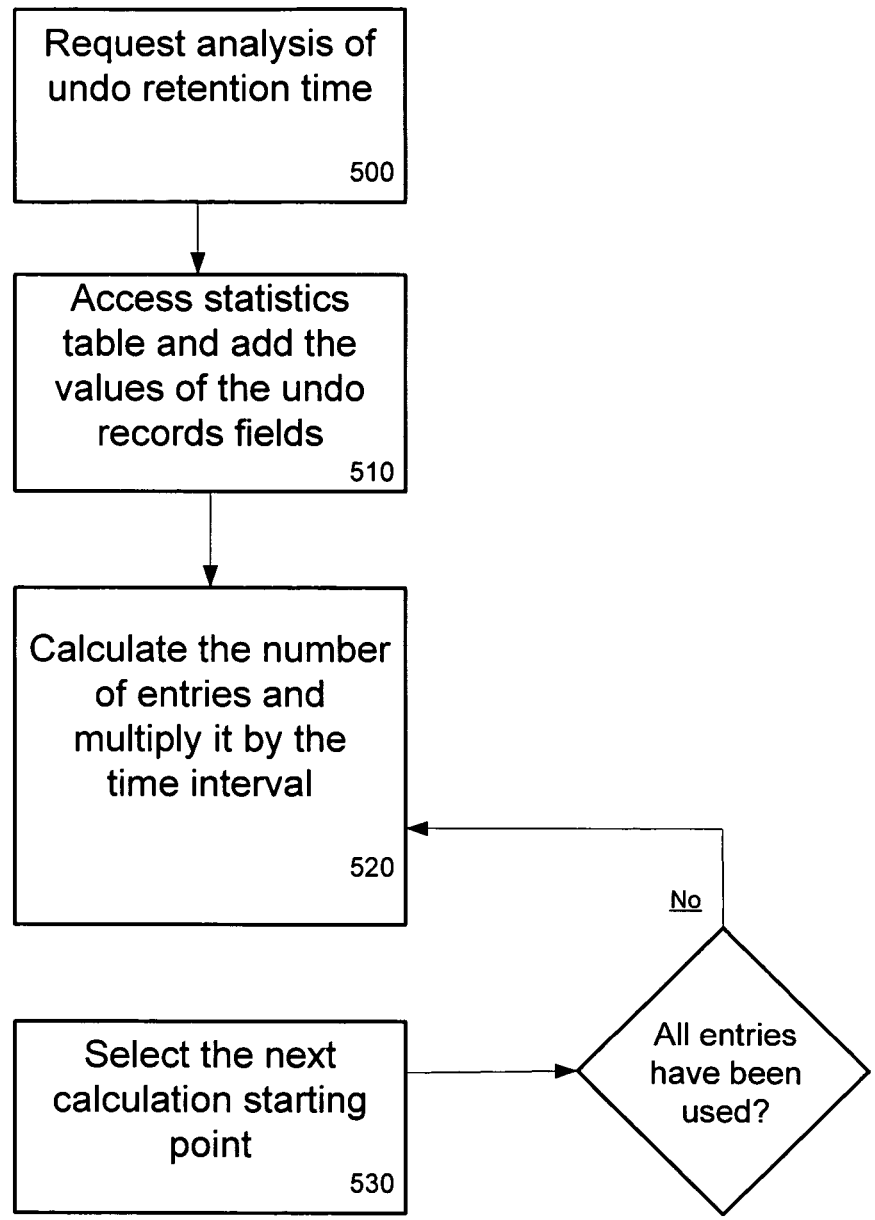
FIG. 5 is a flow diagram of a recommendation of best undo retention process according to one embodiment of the invention.

In one embodiment of the invention, at 500 of FIG. 5 the user requests an indication of the best possible undo retention time given a particular fixed size of the undo tablespace and based on system activity level during a user-specified history time. For example, the user may request an analysis of the best possible retention time for a database system with a fixed undo tablespace size of 2 MB considering system level activity of the past three days. In response to the request, the undo retention advisor determines how long it takes to fill up the fixed size undo tablespace based on historical system data retrieved from the statistics table. At 510 the undo retention advisor 140 accesses the statistics table 120 and adds the values of the undo records fields of the statistics table starting with the most recent statistics table entry until the addition of the next value of the undo records field will cause the total sum to be greater than the fixed undo tablespace size. For example, if undo tablespace size is 2 MB, then the undo retention advisor 140 performs summation calculations until addition of the next value will cause the summation result to be greater than 2 MB. Once the summation operation is finished, at 520 the undo retention advisor 140 calculates the number of entries that were accessed and multiplies it by the time interval value associated with each entry. For example, if each entry in the statistics table is associated with a 10 minutes interval, and it took 3 undo blocks entries to calculate a sum that is equal to or almost equal to the value of the undo tablespace size, then during this 30 minutes interval, i.e. generation time, the activity of the database system generated undo blocks equal to or almost equal to the value of the undo tablespace size.

In one embodiment, at 530 upon storing the calculated length of time during which the system generated undo retention blocks that would fill up the current undo tablespace size, the undo retention advisor 140 performs the same calculation operation starting with the second most recent entry in the statistics table and so on, until all the entries recorded during the specified history time have been used.

In one embodiment, the undo retention advisor 140 provides the user with the recommendation to set the best undo retention time parameter to the minimum value from the plurality of generation time parameters. In another embodiment, the undo retention advisor provides the user with the recommendation to set the best undo retention time parameter to the value equal to 90% of the minimum value of the plurality of generation time parameters. In yet another embodiment, the undo retention advisor provides the user with the recommendation to set the best undo retention time parameter to the average of the values of the plurality of generation time parameters.

In one embodiment, the best undo retention indication is presented to the user via a graphical user interface, an example of which is illustrated in FIG. 4.

Auto-Tuning of Undo Retention

Undo retention records are not only used to recover data, but also to ensure successful execution of database queries. In one embodiment of the invention, every query is associated with a timestamp indicating system time at which the query was issued. In order for the query to succeed, the state of the database objects that the query accesses has to be available as of the query timestamp. For example, if the query was issued at 2 p.m., and it accesses Table 1 and Table 2, the state of Table 1 and Table 2 as of 2 p.m., or the as of the system time associated with 2 p.m., needs to be available for the query to succeed. Thus, the changes that are made to Table 1 and Table 2 since the issuance of the query and stored in associated undo records need to be available in the system for the duration of the query to allow recovery of the database objects states as of the query issuance time when the query accesses the database objects, e.g. Table 1 and Table 2.

In one embodiment of the invention, the undo retention parameter is automatically set based on the length of the longest running query in the system. In addition, the undo retention parameter is dynamically auto-tuned based on system activity.

Figure 6:
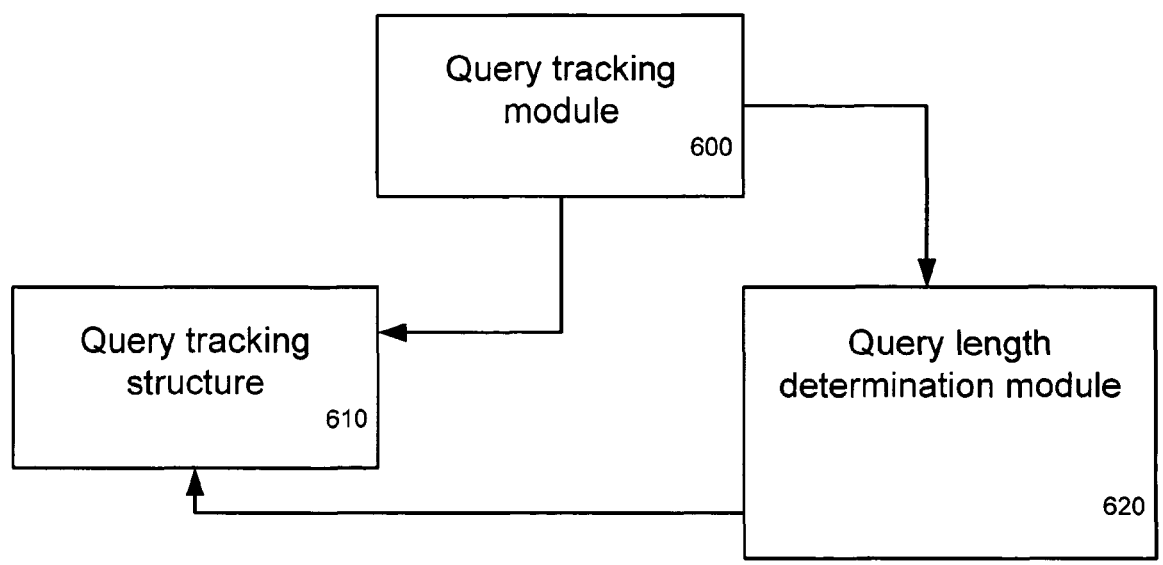
FIG. 6 illustrates is an exemplary system architecture according to one embodiment of the invention.
Figure 7:
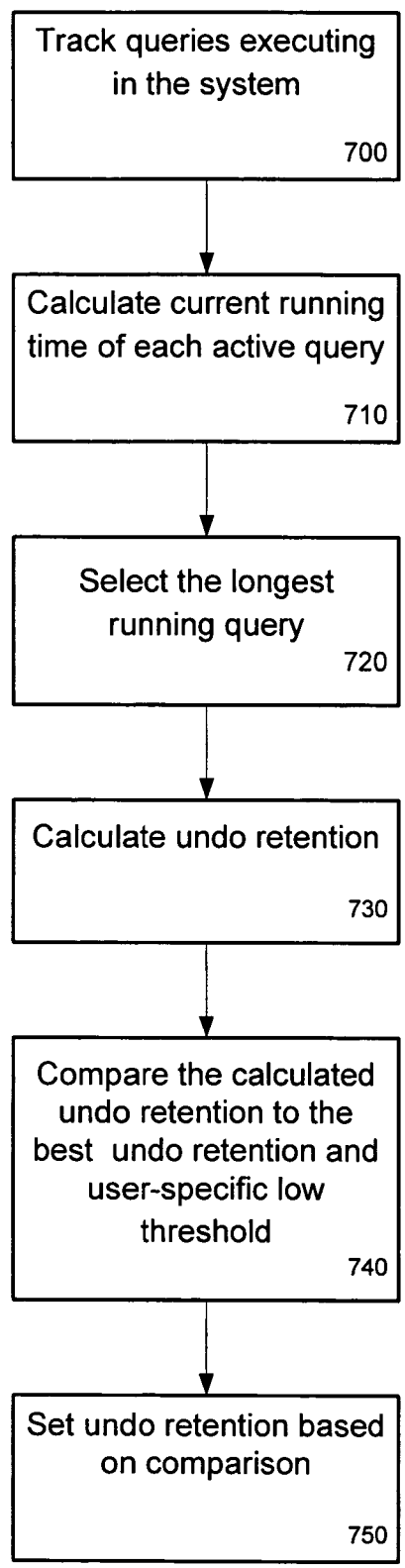
FIG. 7 is a flow diagram of automatic tuning of undo retention process according to one embodiment of the invention.

Embodiments are described further with references to FIG. 7. At 700 a query tracking module 600 of FIG. 6 tracks queries executing in the system to determine the length of the longest running query. The query tracking module 600 periodically examines a cursor associated with each query and tracks the duration and activity of each cursor. Cursors are well-known in the art and no detailed explanation of cursors and their functions is necessary. In one embodiment, only active queries are tracked. In one embodiment, the user may set a query expiration time parameter to specify that if a query is idle for the duration of the query expiration time parameter, then that query is inactive and should not be tracked anymore. For example, if for the last 10 minutes there was no activity associated on a cursor of a particular query, the query tracking module 600 stops tracking that query as it is considered to be inactive. It will be appreciated by one skilled in the art that the user may set the query expiration parameter to any value and the invention is not limited to 10 minutes interval of the above example.

In one embodiment, the query is inactive if it does not access consistent read blocks associated with it. Consistent read blocks include database objects that the query accesses in the state as of the query timestamp.

In one embodiment, the query tracking module 600 maintains a query tracking data structure 610, for example, a table, in which a start time is recorded for each query. Alternatively, the start time may be recorded in the cursor of the query. This start time is then utilized by the query tracking module 600 to calculate the longest running query.

In one embodiment, at 710 the query tracking module 600 periodically, for example, every 1 minute, calculates current running time of each active query by comparing the timestamp of the query stored in the query tracking structure 610 with the current system time. Then, at 720, the query tracking module 600 selects the longest query duration and computes the required undo retention duration necessary to support this longest running query at 730 by adding to the query length a safety parameter which includes the time period and latency in the startup of the tuning process. For example, if the tuning time period is 1 minute and the latency of the startup of the tuning process is 1.5 minutes, then the safety parameter is (1.5*time period). Thus, the required undo retention duration is equal to tracked query length+safety parameter.

For example, if the time period is 1 minute and the current longest query length is 30 minutes, then the required undo retention is 45 minutes.

In one embodiment, at 740, a query length determination module 620 compares the required undo retention duration to the best undo retention and to the user-specified undo retention parameter. In one embodiment, the user may specify the low threshold of undue retention and the tuning process described above tunes the retention above this low threshold as long as the undo tablespace supports such retention. At 750 based on comparison results the query length determination module 620 directs the system to sets system's undo retention. For example, if the required undo retention parameter is less than the best undo retention parameter and less than the user-specified low threshold, then the query length determination module 620 directs the system to set the system's undo retention to the user-specified low threshold. If the required undo retention parameter is less than the best possible retention parameter but greater than the user-specified low threshold, then the query length determination module 620 directs the system to set the system's undo retention to the calculated undo retention value, or alternatively, to the best undo retention. Generation of undo retention records cannot exceed the size of the undo tablespace, and thus, the system sets the undo retention of the system to the value of the best undo retention, if the calculated undo retention duration value is greater than the best undo retention and greater than the user-specified low threshold. In addition, if the required undo retention is greater than the value of the best undo retention, which in turn is greater than the value of the user-specified low threshold, then the query length determination module directs the system to set the undo retention to the best possible retention. If the user-specified low threshold is greater than the required undo retention, which in turn is greater than the best possible retention, then the query length determination module 620 directs the system to set the system's undo retention to best possible retention. In this situation, the longest running query may fail due to lack of necessary undo records.

General

Figure 8:
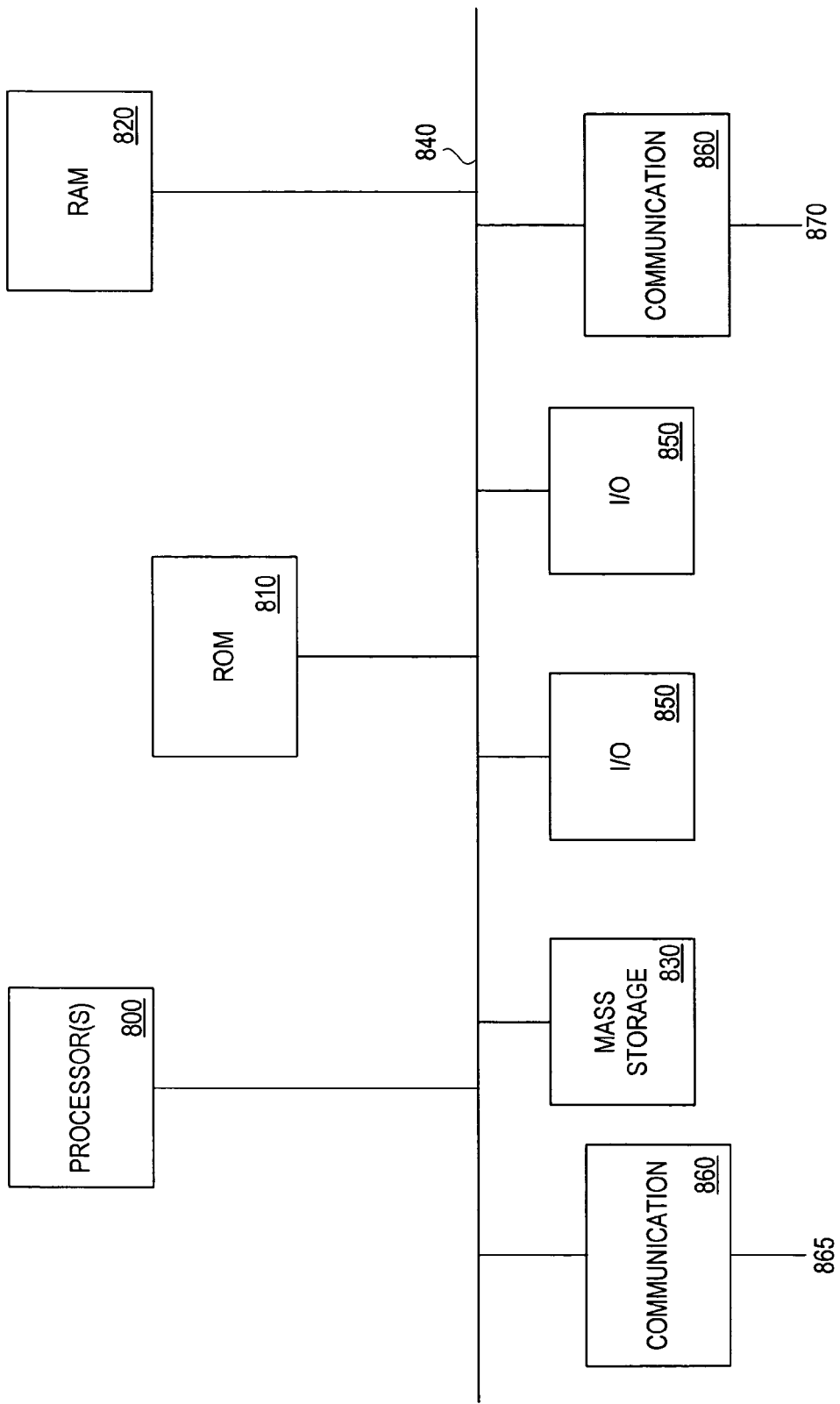
FIG. 8 illustrates a conventional processing system.

It will be appreciated that physical processing systems, which embody components of database system described above, may include processing systems such as conventional personal computers (PCs), embedded computing systems and/or server-class computer systems according to one embodiment of the invention. FIG. 8 illustrates an example of such a processing system at a high level. The processing system of FIG. 8 may include one or more processors 800, read-only memory (ROM) 810, random access memory (RAM) 820, and a mass storage device 830 coupled to each other on a bus system 840. The bus system 840 may include one or more buses connected to each other through various bridges, controllers and/or adapters, which are well known in the art. For example, the bus system 840 may include a 'system bus', which may be connected through an adapter to one or more expansion buses, such as a peripheral component interconnect (PCI) bus or an extended industry standard architecture (EISA) bus. Also coupled to the bus system 840 may be the mass storage device 830, one or more input/output (I/O) devices 850 and one or more data communication devices 860 to communicate with remote processing systems via one or more communication links 865 and 870, respectively. The I/O devices 850 may include, for example, any one or more of: a display device, a keyboard, a pointing device (e.g., mouse, touch pad, trackball), and an audio speaker.

The processor(s) 800 may include one or more conventional general-purpose or special-purpose programmable microprocessors, digital signal processors (DSPs), application specific integrated circuits (ASICs), or programmable logic devices (PLD), or a combination of such devices. The mass storage device 830 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 860 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

The term "computer-readable medium", as used herein, refers to any medium that provides information or is usable by the processor(s). Such a medium may take many forms, including, but not limited to, non-volatile and volatile media. Non-volatile media, i.e., media that can retain information in the absence of power, includes ROM, CD ROM, magnetic tape and magnetic discs. Volatile media, i.e., media that cannot retain information in the absence of power, includes main memory.

Thus, methods and apparatuses for data recovery in database systems have been described. Although the invention has been described with reference to specific exemplary embodiments, it will be evident that various modifications and changes may be made to these embodiments without departing from the broader spirit and scope of the invention as set forth in-the claims. Accordingly, the specification and drawings are to be regarded in an illustrative sense rather than a restrictive sense.

The invention claimed is:

1. A method comprising:
obtaining a user-specified undo retention time;
obtaining a history time parameter;
accessing system statistics collected over a period of time specified by the history time parameter;
calculating undo tablespace size using a processor for the user-specified undo retention time based at least in part on the user-specified undo retention time and on the system statistics collected over the period of time specified by the history time parameter;
storing the calculated undo tablespace size in a device; and
providing the calculated undo tablespace size as a recommendation to a user or for use by the user.

2. The method of claim 1 wherein the calculating the undo tablespace size comprises calculating a plurality of summations.

3. The method of claim 2 wherein the plurality of summations comprises a first summation calculated by calculating a sum of undo retention blocks starting with a most recent statistics interval and ending with a statistics interval recorded prior to the most recent statistics interval by the undo retention time.

4. The method of claim 3 wherein the plurality of summations comprises a second summation calculated by calculating a sum of undo retention blocks by starting with a second most recent statistics interval and ending with a statistics interval recorded prior to the second most recent statistics interval by the undo retention time.

5. The method of claim 4 wherein the calculating the undo tablespace size further comprises calculating summations until all statistics intervals recorded during a time interval equal to the history time parameter have been used in calculations.

6. The method of claim 5 further comprising selecting a maximum summation from the plurality of summations and providing a user with recommendation to set the undo tablespace size to a value of the maximum summation.

7. The method of claim 4 further comprising selecting a maximum summation from a plurality of summations and providing a user with recommendation to set the undo tablespace size to a value of 110% of the maximum summation.

8. The method of claim 4 further comprising calculating an average of a plurality of summations and providing a user with recommendation to set the undo tablespace size to a value of an average of the plurality of the summations.

9. The method of claim 1 comprising recommending a user to set the undo tablespace size to the calculated undo tablespace size and setting the undo tablespace size to a recommended value upon the user accepting recommendation.

10. The method of claim 1, further comprising displaying the calculated undo tablespace size to a user.

11. The method of claim 1, further comprising using the calculated undo tablespace size for an undo operation.

12. The method of claim 1, wherein the calculated undo tablespace size is provided as the recommendation to the user before it is used in an undo operation.

13. An apparatus comprising:
a processor; and
an undo tablespace advisor module, implemented using the processor, to calculate undo tablespace size for user-specified undo retention time based on system statistics collected over a period of time specified by a history time parameter, and to store the calculated undo tablespace size.

14. The apparatus of claim 13 wherein the undo tablespace advisor calculates a plurality of summations.

15. The apparatus of claim 14 wherein the undo tablespace advisor selects a maximum summation from the plurality of summations and providing a user with recommendation to set the undo tablespace size to the value of the maximum summation.

16. The apparatus of claim 13 wherein the undo tablespace advisor via a user interface recommends a user to set the undo tablespace size to the calculated undo tablespace size and sets the undo tablespace size to a recommended value upon the user accepting recommendation.

17. An article of manufacture comprising:
a non-transitory computer-readable medium comprising a volatile or non-volatile medium having stored therein instructions, an execution of which results in a performance of a method by a processing system, the method comprising:
obtaining a user-specified undo retention time;
obtaining a history time parameter;
accessing system statistics collected over a period of time specified by the history time parameter;
calculating undo tablespace size using a processor for the user-specified undo retention time based at least in part on the user-specified undo retention time and on the system statistics collected over the period of time specified by the history time parameter;
storing the calculated undo tablespace size; and
providing the calculated undo tablespace size as a recommendation to a user or for use by the user.

18. The article of manufacture of claim 17, wherein the calculated undo tablespace size is provided as the recommendation to the user before it is used in an undo operation.

19. The article of manufacture of claim 17, wherein the calculating the undo tablespace size comprises calculating first summation by calculating a sum of undo retention blocks starting with the most recent statistics interval and ending with a statistics interval recorded prior to the most recent statistics interval by the undo retention time.

20. The article of manufacture of claim 19, wherein the calculating the undo tablespace size further comprises calculating a second summation by calculating a sum of undo retention blocks by starting with the second most recent statistics interval and ending with a statistics interval recorded prior to the second most recent statistics interval by the undo retention time.

21. The article of manufacture of claim 20, wherein the calculating the undo tablespace size further comprises calculating summations until all statistics intervals recorded during a time interval equal to the history time parameter have been used in calculations.

22. The article of manufacture of claim 21 wherein the method further comprises selecting a maximum summation from a plurality of summations and providing a user with recommendation to set the undo tablespace size to the value of the maximum summation.

23. A method comprising:
calculating a best possible undo retention time using a processor based at least in part on a fixed undo tablespace size and system activity level during a user-specified history time;
storing the calculated best possible undo retention time in a device; and
providing the calculated best possible undo retention time as a recommendation to a user or for use by the user.

24. The method of claim 23, further comprising displaying the calculated best possible undo retention time to a user.

25. The method of claim 23, further comprising using the best possible undo retention time for an undo operation.

26. The method of claim 23, wherein the calculated best possible undo retention time is provided as the recommendation to the user before it is used in an undo operation.

27. The method of claim 23 wherein the calculating the best possible undo retention time comprises calculating a plurality of summations.

28. The method of claim 27 wherein the plurality of summations comprises a first summation calculated by adding undo records starting with the most recent statistics interval until addition of next undo record causes the first summation to be greater than the fixed undo tablespace size.

29. The method of claim 28 further comprising calculating a first generation time parameter from a plurality of generation time parameters by multiplying a number of statistics intervals used in calculating the first summation by a value of the statistics interval.

30. The method of claim 29 wherein the plurality of summations comprises a second summation calculated by adding undo records starting with the second most recent statistics interval until addition of next undo record causes the second summation to be greater than the fixed undo tablespace size.

31. The method of claim 30 further comprising calculating the second generation time parameter from the plurality of generation time parameters by multiplying a number of statistics intervals used in calculating the second summation by a value of the statistics interval.

32. The method of claim 31 further comprising providing a user with a recommendation to set the best undo retention time parameter to a minimum value from the plurality of generation time parameters.

33. The method of claim 31 further comprising providing a user with a recommendation to set the best undo retention time parameter to a value equal to 90% of a minimum value of the plurality of generation time parameters.

34. The method of claim 31 further comprising providing a user with a recommendation to set the best undo retention time parameter to an average of values of the plurality of generation time parameters.

35. An apparatus comprising:
a processor; and
an undo retention advisor, implemented using the processor, to calculate a best possible undo retention time based at least in part on a fixed undo tablespace size and system activity level during a user-specified history time, to store the calculated best possible undo retention time, and to provide the calculated best possible undo retention time as a recommendation to a user or for use by the user.

36. The apparatus of claim 35, wherein the undo retention advisor is configured to provide the calculated best possible undo retention time as the recommendation to the user before it is used in an undo operation.

37. The apparatus of claim 35 further comprising the undo retention advisor to calculate a plurality of summations.

38. The apparatus of claim 37 further comprising the undo retention advisor to calculate a plurality of generation time parameters.

39. The apparatus of claim 38 wherein the undo retention advisor further to recommend a user to set the best undo retention time parameter to a minimum value of the plurality of generation time parameters.

40. The apparatus of claim 38 wherein the undo retention advisor further to recommend a user to set the best undo retention time parameter to a value equal to 90% of a minimum value of the plurality of generation time parameters.

41. An article of manufacture comprising:
a non-transitory computer-readable medium comprising a volatile or non-volatile medium having stored therein instructions, an execution of which results in a performance of a method by a processing system, the method comprising:
calculating a best possible undo retention time using a processor based at least in part on a fixed undo tablespace size and system activity level during a user-specified history time;
storing the calculated best possible undo retention time; and
providing the calculated best possible undo retention time as a recommendation to a user or for use by the user.

42. The article of manufacture of claim 41, wherein the calculated best possible undo retention time is provided as the recommendation to the user before it is used in an undo operation.

43. The article of manufacture of claim 41 wherein the method further comprises calculating a plurality of summations.

44. The article of manufacture of claim 43 wherein the method further comprises calculating a plurality of generation time parameters.

45. The article of manufacture of claim 44 wherein the method further comprises recommending to a user to set the best undo retention time parameter to a minimum value of the plurality of generation time parameters.

* * * * *

UNITED STATES PATENT AND TRADEMARK OFFICE
CERTIFICATE OF CORRECTION

| | | |
|---|---|---|
| PATENT NO. | : 8,756,200 B2 | Page 1 of 1 |
| APPLICATION NO. | : 10/846095 | |
| DATED | : June 17, 2014 | |
| INVENTOR(S) | : Yang et al. | |

It is certified that error appears in the above-identified patent and that said Letters Patent is hereby corrected as shown below:

In the Specification

Column 3, line 52, delete "FIG. 4" and insert -- FIG. 4. --, therefor.

Signed and Sealed this
Tenth Day of February, 2015

Michelle K. Lee
*Deputy Director of the United States Patent and Trademark Office*